United States Patent
Ferra et al.

(10) Patent No.: US 9,003,766 B2
(45) Date of Patent: Apr. 14, 2015

(54) GAS COOLER AND METHOD FOR COOLING GAS

(75) Inventors: Paul W. Ferra, Derby (GB); Yi Wang, Nottingham (GB)

(73) Assignee: ROLLS-ROYCE plc, London (GB)

( * ) Notice: Subject to any disclaimer, the term of this patent is extended or adjusted under 35 U.S.C. 154(b) by 622 days.

(21) Appl. No.: 13/439,459

(22) Filed: Apr. 4, 2012

(65) Prior Publication Data
US 2012/0279228 A1    Nov. 8, 2012

(30) Foreign Application Priority Data

May 3, 2011    (GB) .................................. 1107256.8

(51) Int. Cl.
*F02C 7/12*    (2006.01)
*F01D 25/18*    (2006.01)
*F02C 6/06*    (2006.01)

(52) U.S. Cl.
CPC ................ *F01D 25/183* (2013.01); *F02C 6/06* (2013.01)

(58) Field of Classification Search
CPC ......... Y02T 50/675; F02C 7/18; F02C 7/185; F01D 25/18; F01D 25/183; F01D 25/20; F01D 25/22
See application file for complete search history.

(56) References Cited

U.S. PATENT DOCUMENTS

| 4,497,172 | A | 2/1985 | Smith |
| 5,611,661 | A | 3/1997 | Jenkinson |
| 6,305,156 | B1 * | 10/2001 | Lui .................................. 60/785 |
| 2006/0123795 | A1 | 6/2006 | Fish et al. |
| 2007/0243811 | A1 | 10/2007 | Alecu et al. |
| 2010/0107594 | A1 * | 5/2010 | Coffinberry et al. ....... 60/39.093 |

OTHER PUBLICATIONS

Aug. 24, 2011 Search Report issued in British Patent Application No. GB1107256.8.

* cited by examiner

*Primary Examiner* — Craig Kim
(74) *Attorney, Agent, or Firm* — Oliff PLC

(57) ABSTRACT

There is disclosed a gas cooler 20 for providing high-pressure sealing gas to a bearing chamber. The cooler comprises a turbine 22; a turbine inlet 24 arranged to receive gas to drive the turbine and a turbine outlet 26 arranged to deliver gas output from the turbine; a compressor 28 arranged to be driven by the turbine 22; a compressor inlet 30 arranged to receive gas to be compressed by the compressor and a compressor outlet 32 arranged to deliver gas output from the compressor 28; and a cooler outlet 36 in fluid communication with the turbine outlet 26 and the compressor outlet 32 so as to deliver high-pressure sealing gas comprising gas merged from the turbine outlet 26 and the compressor outlet 32.

16 Claims, 5 Drawing Sheets

GAS COOLER AND METHOD FOR COOLING GAS

The invention relates to a gas cooler for providing high-pressure sealing gas to a bearing chamber and a method for providing high-pressure sealing gas to a bearing chamber.

In gas-turbine engines it is known to support a rotatable shaft within the engine chamber using a number of support structures. Each support structure comprises a bearing housing which comprises a bearing chamber within which a number of bearing elements are located. In order to lubricate the bearing elements, oil is continually fed from an oil tank to the bearing chamber using a feed pump. A scavenge pump is used to continually remove oil from the bearing chamber and return it, after filtering, to the oil tank. This ensures that the bearing chamber is continually provided with cool and clean oil.

It is desirable to prevent oil from leaking out of the bearing chamber. This is because the leakage of oil can, amongst other things create cabin odour in the case of a gas-turbine for a jet engine. Also, it results in oil loss from the oil system which is undesirable.

There are a number of known ways of preventing oil from leaking out of the bearing chamber.

In one previously considered arrangement buffers are provided either side of the bearing housing in the region where the rotating shaft enters and exits the bearing housing. High-pressure sealing air from a compressor stage of the gas-turbine engine is fed into the buffers which ensures a positive flow of air into the bearing chamber. This prevents any oil from leaking out of the bearing chamber.

Since the air from the compressor of the gas-turbine engine may have a temperature exceeding the target air temperature within the buffer, it is known to cool the high-pressure compressor air using a cooler.

Figure 1:
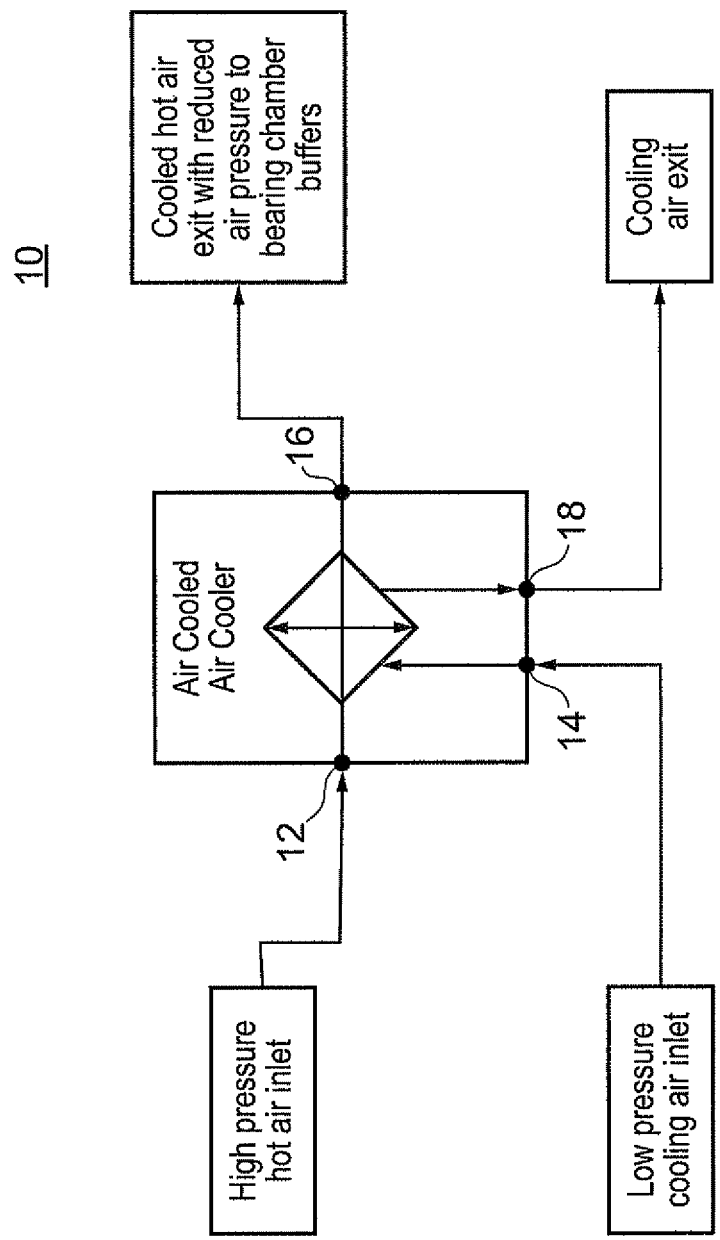

A previously considered arrangement for cooling high-pressure air from the compressor of the gas-turbine engine for use as high-pressure sealing air for a bearing chamber is shown in FIG. 1. In FIG. 1, an air cooled air cooler (heat exchanger) 10 is used to lower the temperature of the high pressure air. The air cooler 10 comprises a heat exchanger having a high-pressure air inlet 12, a cooling air inlet 14, a sealing air outlet 16 and a cooling air outlet 18. High-pressure air is taken from a suitable compressor stage of the gas turbine engine and is delivered to the cooler 10 through the high-pressure air inlet 12. The air pressure is sufficiently higher than the target pressure for the bearing chamber buffer. Low-pressure cooling air from a cool air source is delivered to the cooler 10 through the cooling air inlet 14. The heat exchanger of the cooler 10 uses the cooling air to lower the temperature of the high-pressure air. The cooled high-pressure air is output from the sealing air outlet 16 and is delivered to a bearing chamber buffer (not shown) where it is used as to ensure a positive flow into the bearing chamber, thereby restricting the leakage of oil. The cooling air, which has an increased temperature, is output from the cooling air outlet 18 and is discharged, in the case of an aircraft, overboard.

Whilst the arrangement of FIG. 1 may be suitable for some arrangements, it has a number of disadvantages. As the cooling air input through the cooling air inlet 14 has a relatively low pressure, the heat exchanger requires a relatively large flow area in order to drive it through the heat exchanger 10. This results in a relatively large and heavy cooling unit. In addition, in the case of an aircraft, the cooling air discharged overboard can disturb the engine aerodynamics and can lead to significant engine performance loss.

It is therefore desirable to provide an improved gas cooler for providing sealing air to a bearing chamber.

According to an aspect of the invention there is provided a gas cooler for providing high-pressure sealing gas to a bearing chamber, comprising: a turbine; a turbine (or high-pressure) inlet arranged to receive gas to drive the turbine and a turbine (or high pressure) outlet arranged to deliver gas output from the turbine; a compressor arranged to be driven by the turbine; a compressor (or low pressure) inlet arranged to receive gas to be compressed by the compressor and a compressor (or low pressure) outlet arranged to deliver gas output from the compressor; and a cooler outlet in fluid communication with the turbine outlet and the compressor outlet so as to deliver high-pressure sealing gas comprising gas merged from the turbine outlet and the compressor outlet. The term "high-pressure sealing gas" means that the gas is of a sufficiently high pressure to be used to help seal a bearing chamber.

The turbine inlet may be arranged to receive high-pressure gas and the turbine may be arranged to extract energy from the gas, thereby decompressing it, such that decompressed gas is delivered from the turbine outlet. The compressor inlet may be arranged to receive low-pressure gas and the compressor may be arranged to work the gas to compress it, such that compressed gas is delivered from the compressor outlet. The turbine may reduce the temperature of the gas it receives and the compressor may be arranged to increase the temperature of the gas it receives. The high-pressure sealing gas delivered from the cooler outlet may have a temperature and pressure less than the gas received by the turbine inlet and a temperature and pressure greater than the gas received by the compressor inlet.

The turbine may be any device capable of extracting mechanical energy from a gas and the compressor may be any device capable of using mechanical energy to introduce energy into a gas. For example, the turbine may comprise a centrifugal turbine and the compressor may comprise a centrifugal compressor. The turbine may comprise at least one turbine paddle rotatable within a chamber and the compressor may comprise at least one compressor paddle rotatable within a chamber. The turbine paddle and the compressor paddle may be rotatably coupled. The turbine paddle and the compressor paddle may be rotatably coupled by a common shaft.

The gas cooler may further comprise a heat exchanger. The heat exchanger may have a high-temperature gas path and a separate low-temperature gas path such that in use gas within the low-temperature gas path acts to transfer energy from, or cool, the gas in the high-temperature gas path. The high-temperature gas path may be between the turbine inlet and the turbine outlet. The high-temperature gas path may be part of a gas path between the turbine inlet and the turbine outlet. The low-temperature gas path may have a low-temperature inlet between the compressor inlet and the compressor outlet and a low-temperature outlet.

The high-temperature gas path may be after the turbine. This would mean that the gas introduced into the turbine inlet would flow through the high-temperature gas path of the heat exchanger before entering the turbine. The high-temperature gas path may be before the turbine. This would mean that the gas introduced into the turbine inlet would flow through high-temperature gas path after flowing through the turbine, before being delivered from the turbine outlet.

The low-temperature inlet of the heat exchanger may be after the compressor. Therefore some of the gas exiting the compressor may be diverted through the low-temperature gas path of the heat exchanger. The low-temperature inlet of the heat exchanger may be before the compressor. Therefore, some of the gas introduced into the compressor gas inlet may be diverted through the low-temperature gas path of the heat exchanger. A valve may be provided to control the gas flow through the low-temperature gas path. This would allow the amount of gas flowing through the low-temperature gas path of the heat exchanger to be varied.

A bypass line, having a bypass outlet, may be provided after the turbine. This would allow some of the gas exiting the turbine to be diverted away from the turbine outlet and discharged through the bypass outlet. For example, contaminated gas, containing debris for example, exiting the turbine could be discharged from the bypass outlet. In one example, all of the gas exiting the turbine could be discharged through the bypass outlet. In such an arrangement no gas would exit the turbine outlet. A separator may be provided after the turbine for separating contaminated gas from clean gas. The contaminated gas may be discharged from the bypass outlet and the clean gas may be delivered from the turbine outlet. A bypass valve may be provided to control the gas flow out of the bypass outlet.

The invention also concerns a gas turbine engine comprising a bearing chamber and a gas cooler in accordance with any statement herein wherein the cooler outlet is arranged to supply high-pressure sealing gas to the bearing chamber. High-pressure high-temperature air from a compressor stage of the gas-turbine engine may be received by the turbine inlet of the cooler.

According to a second aspect of the invention there is provided a method of cooling gas and providing high-pressure sealing gas to a bearing chamber, comprising: receiving gas at a turbine inlet so as to drive a turbine and delivering gas output from the turbine from a turbine outlet; receiving gas at a compressor inlet and compressing the gas using a compressor driven by the turbine and delivering gas output from the compressor at a compressor outlet; merging the gas delivered from the turbine outlet and the compressor outlet; and delivering the merged gas from a cooler outlet to a bearing chamber as high-pressure sealing gas.

The invention may comprise any combination of the features and/or limitations referred to herein, except combinations of such features as are mutually exclusive.

Figure 2:
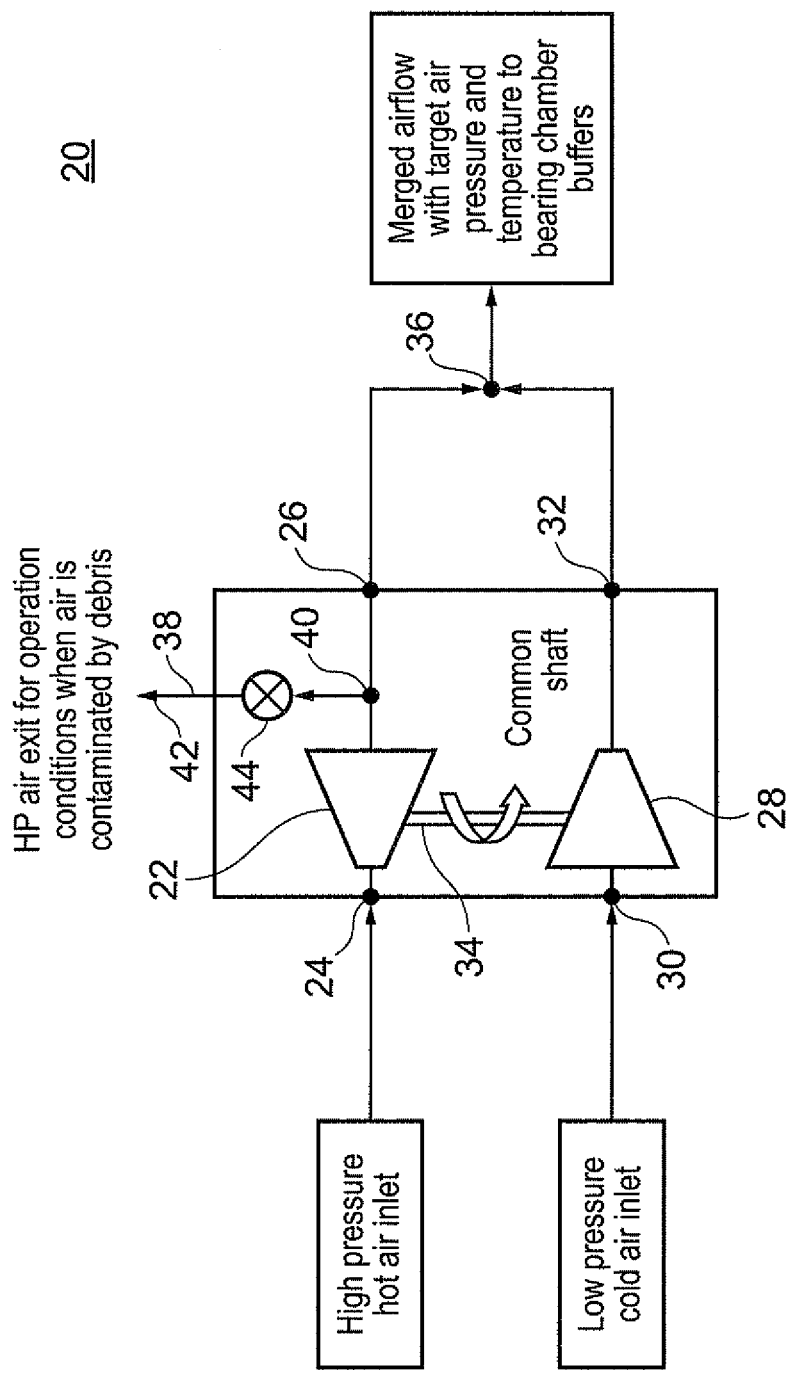
Figure 3:
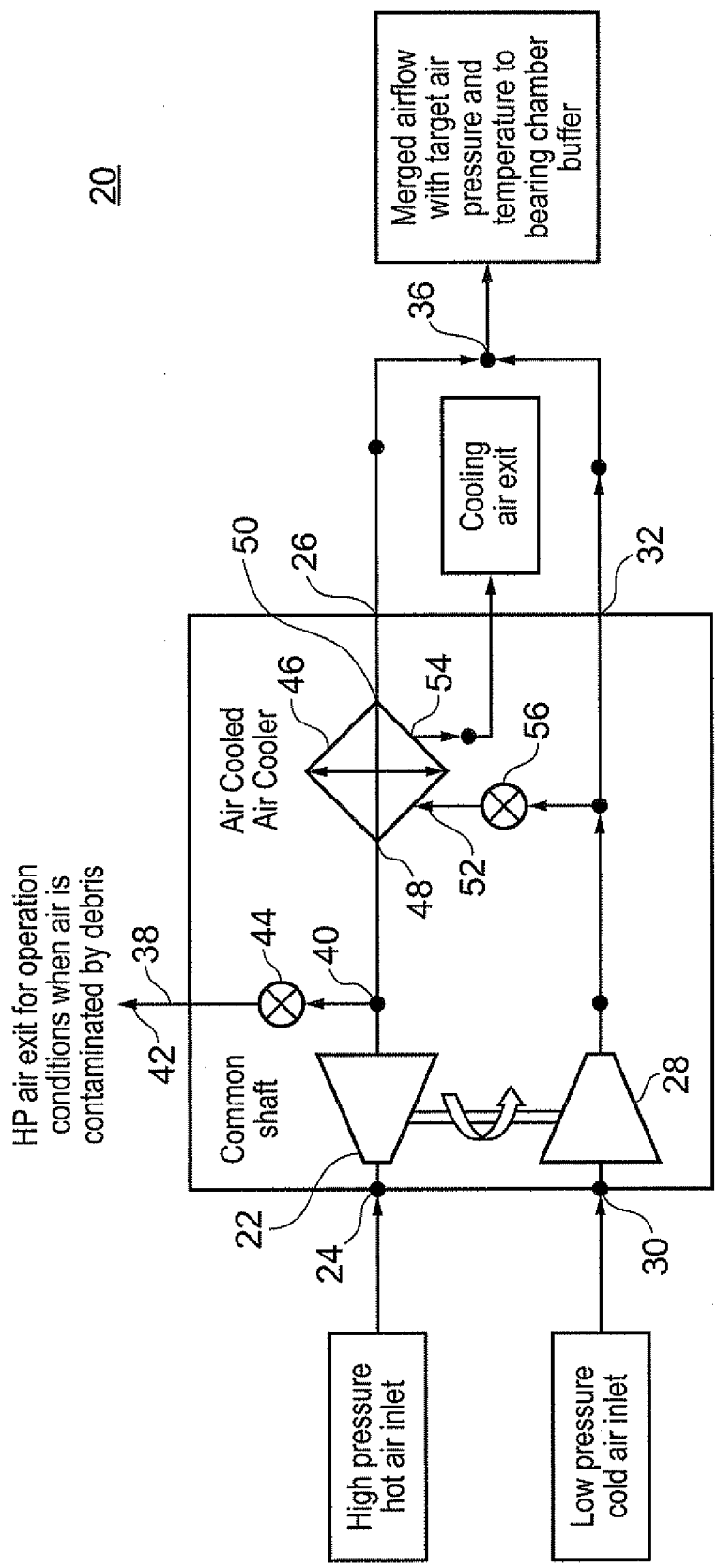
Figure 4:
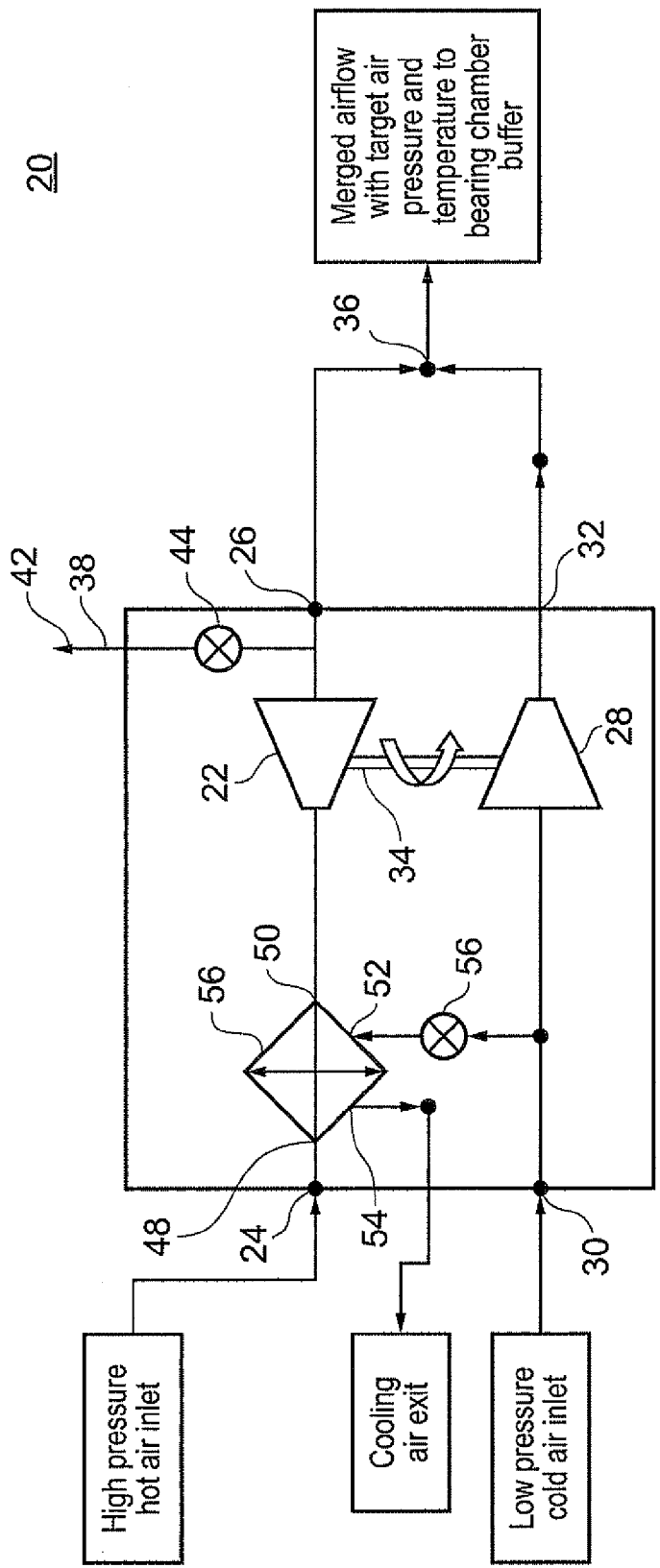
Figure 5:
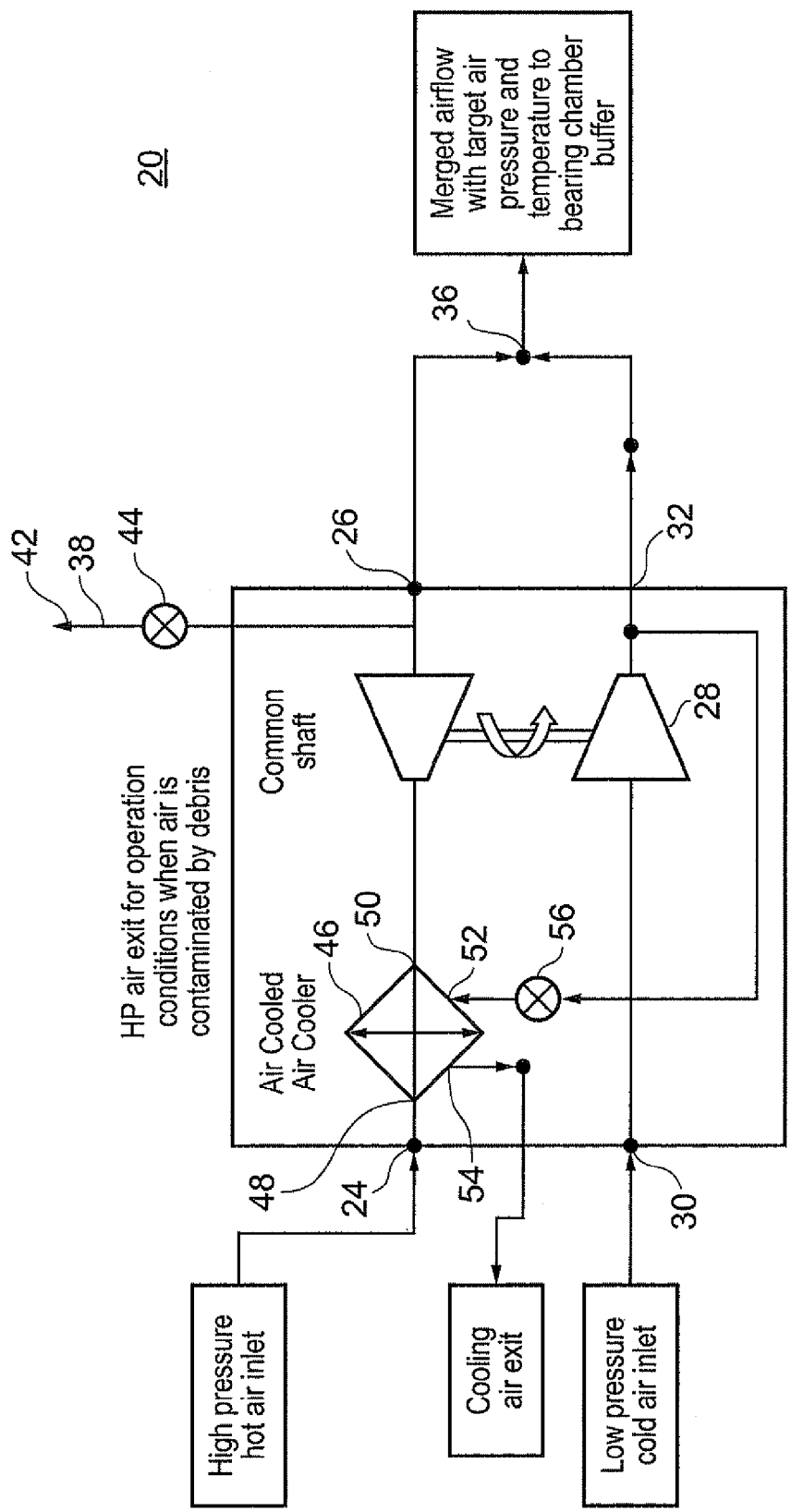

Embodiments of the invention will now be described, by way of example, with reference to the accompanying drawings, in which:

FIG. 1 schematically illustrates a previously considered cooling arrangement for providing sealing air to a bearing chamber of a gas turbine engine;

FIG. 2 schematically illustrates a gas cooler according to an aspect of the invention;

FIG. 3 schematically illustrates a gas cooler according to another aspect of the invention;

FIG. 4 schematically illustrates a gas cooler according to another aspect of the invention; and FIG. 5 schematically illustrates a gas cooler according to another aspect of the invention.

FIG. 2 shows a gas cooler 20 for providing high-pressure sealing air to a bearing chamber. In this embodiment the gas cooler and the bearing chamber are part of a gas turbine engine. However, it should be appreciated that in other embodiments the gas cooler 20 may be used to provide high-pressure sealing air to a bearing chamber of another device. The cooler 20 comprises a turbine 22 having a high-pressure turbine air inlet 24 and a high-pressure turbine air outlet 26, and a compressor 28 having a low-pressure compressor air inlet 30 and a low-pressure compressor air outlet 32. The turbine 22 is arranged to drive the compressor 28. In this embodiment a common shaft 34 connects the turbine 26 and the compressor 28. However, it should be appreciated that in other embodiments the turbine 22 and the compressor 28 may be connected together by other means such that the turbine 22 can drive the compressor 28. In this particular embodiment the turbine 22 is a centrifugal turbine and the compressor 28 is a centrifugal compressor (or pump). However, the turbine 22 may be any device that is capable of extracting mechanical energy from a gas and the compressor 28 may be any device capable of increasing the energy of a gas using mechanical energy. In an alternative arrangement, the turbine 22 may be a rotatable turbine paddle or element housed in a chamber and the compressor 28 may be a rotatable compressor paddle or element housed in a chamber and rotatably coupled to the turbine paddle. For example, the turbine paddle and compressor paddle may be connected by a common shaft.

The gas cooler 20 also comprises a cooler outlet 36 that is in fluid communication with both the turbine outlet 26 and the compressor outlet 28. In use, gas delivered from the turbine outlet 26 and the compressor outlet 32 is merged and output as a single high-pressure sealing gas flow from the cooler outlet 36.

The gas cooler 20 further comprises a bypass line 38 having a bypass inlet 40 located between the turbine 22 and the turbine outlet 26 and a bypass outlet 42. The bypass line 38 is also provided with a bypass valve 44 which enables the flow through the bypass line 38 to be controlled. Although in this embodiment the bypass valve 44 is located in the bypass line 38, in other embodiments the bypass valve 44 may be located at the bypass inlet 40, for example.

In use, high-pressure high-temperature air from a compressor stage (not shown) of a gas turbine engine is supplied to the high-pressure turbine inlet 24 of the cooler 20. The pressure of the air from the compressor stage is sufficiently higher than a target pressure in a bearing chamber buffer to which high-pressure sealing air is to be supplied. However, the temperature of the air is too high. Low-pressure low-temperature air is supplied to the low-pressure compressor inlet 30. Any suitable low-pressure low-temperature air could be used. For example, if the gas cooler 20 is used in an aircraft, the aircraft could comprise an air duct into which ambient air is forced and subsequently supplied to the compressor inlet 30.

The high-pressure high-temperature air enters and drives the turbine 22 and hence the turbine 22 extracts mechanical work from the high-pressure high-temperature air. The air input into the turbine 22 is therefore decompressed and exits the turbine 22 having a lower pressure and temperature. The turbine 22, driven by the high-pressure high-temperature air, drives the compressor 26 which therefore compresses the low-pressure low-temperature air introduced into the compressor through the compressor inlet 30. The air that exits the compressor 28 therefore has an increased pressure and temperature.

The compressed cool air from the compressor outlet 32 is then mixed, or merged, with the decompressed hot air from the turbine 22 at the cooler outlet 36 which delivers, or outputs, high-pressure sealing air for a bearing chamber. The pressure of the sealing air delivered from the outlet 36 is greater than the pressure within the bearing chamber and therefore can be used to seal the bearing chamber. However, the temperature of the air is cooler than the air supplied from the compressor stage of the gas turbine engine so as not to cause damage to the bearing chamber or the components housed therein.

In summary, the turbine 22 decompresses and cools high-pressure high-temperature air and the compressor 28 compresses and heats low-pressure low-temperature air. The two gas flows are merged so as to provide sealing air having a sufficiently high pressure such that it can be used to seal a bearing chamber, but not having an excessively high temperature that could potentially cause damage to the bearing chamber or the components housed therein.

The high-pressure air introduced into the turbine 22 may be decompressed to the same pressure as compressed air provided by the compressor 32. However, in other embodiments the pressures may be different.

If the high-pressure high-temperature air introduced into the turbine 22 through the turbine inlet 24 is contaminated with debris such as particulate matter, the gas discharged from the turbine 22 may in fact bypass the high-pressure turbine outlet 26 and may instead exit through the bypass outlet 42 by opening the bypass valve 44. The particulate matter could be sand or material abraded from the tips of compressor blades, for example. The bypass valve 34 therefore prevents high pressure air contaminated with debris from being fed to the bearing chamber where it may cause damage. Although the air from the turbine 22 would be completely discharged, high-pressure sealing air could still be delivered to the bearing chamber from the compressor 28 through the cooler outlet 36.

Also, although not shown in FIG. 2, a small high-pressure air bleed from a feed between the turbine inlet 24 and the turbine outlet 26 could be used as a dry bearing for reducing the rotational friction between components of the turbine 22 and/or compressor 28.

The gas cooler of in FIG. 2 has a number of advantages over the previously considered arrangement of FIG. 1. In particular the high pressure air energy is fully utilised, leading to reduced air temperature. In other words, the high pressure air is itself used to aid in the cooling process by driving the compressor 28. Also, there is no cooling air discharged overboard, as is present in the arrangement of FIG. 1. When used in an aircraft, this may improve the aerodynamic performance of the aircraft.

Further, a low pressure cooling air source with a regulated pressure level is no longer required to drive the cooling airflow as it is driven through the compressor by the turbine. The compressor also increases its pressure to a desired pressure. In view of this, ram (or ambient) low-pressure air can be used as the cooling air source. Also, air that is used for other purposes in the gas-turbine engine could be used as the low pressure cooling source air. For example, anti-icing air, which is cold in temperature and would normally be discharged due to insufficient air pressure, could be used.

The invention is also capable of diverting high pressure air when it is contaminated with debris, whilst maintaining a flow of sealing air to the bearing chamber buffers, by using the cooling air with increased pressure.

The invention may also be useful if the amount of high-pressure high-temperature air that can be supplied from the compressor stage of the gas-turbine engine is limited or restricted.

FIG. 3 shows a gas cooler 20 in accordance with a second embodiment of the invention. FIG. 3 contains all of the features of FIG. 2, the features performing the same functions as those described above in relation to FIG. 2. Like features have the same reference numerals.

FIG. 3 differs from FIG. 2 in that the gas cooler 20 further includes a heat exchanger 46. The heat exchanger has a high-temperature gas path having an inlet 48 and an outlet 50 and a separate low-temperature gas path having an inlet 52 and an outlet 54. The high-temperature gas path is part of the gas path between the turbine inlet 24 and outlet 26 and is downstream, or after, the turbine 22. Therefore, the gas exiting the turbine 22 flows through the high-temperature gas path of the heat exchanger 46 before being delivered from the turbine outlet 26 and merged with gas from the compressor. The low-temperature inlet 52 delivers compressed air from the compressor 28 and is therefore located downstream of the compressor 28. The low-temperature outlet 54 discharges low-temperature air overboard. A heat exchanger valve 56 is provided to control the flow of air through the low-temperature gas path.

The gas cooler 20 functions in a similar way to that of the first embodiment. However, the heat exchanger 46 acts to further cool the decompressed air that exits the turbine 22. Specifically, the air flowing through the low-temperature gas path from the compressor 28 acts to cool the gas flowing in the high-temperature gas path from the turbine 22 before it exits through the turbine outlet 26. This particular arrangement may be desirable if the temperature requirement of the bearing chamber buffer cannot be met by decompression of the high pressure air alone. The valve 44 allows the heat exchanger to be selectively used, if needed.

As will be apparent to one skilled in the art, any suitable type of heat exchanger may be used.

The cooling arrangement of FIG. 3 provides all of the advantages of the arrangement of FIG. 2, except that in FIG. 3, it is necessary to expel used cooling air from the heat exchanger.

The invention as shown in FIG. 3 may be further advantageous in that as the cooling air provided to the heat exchanger 46 is compressed air provided by the compressor 28, the pressure of the cooling air is increased. This leads to a smaller flow area needed in the heat exchanger 46 than in the heat exchanger of FIG. 1 and hence a more compact design.

The air pressure of the cooling air outputted from the heat exchanger 46 through outlet 54 may be higher than the pressure of the cooling air source input through compressor inlet 30. The air outputted from the heat exchanger 46 could therefore be re-introduced into fan air stream to provide thrust.

As the heat exchanger 46 may only be used for further cooling when needed, the amount of airflow through the cooler 20 may be less than in the arrangement of FIG. 1, which leads to smaller cooler and improved engine performance.

Also, as the high-pressure high-temperature air introduced into the turbine 22 through the turbine inlet 26 is first cooled by decompression in the turbine 22, the air entering the heat exchanger 46 through inlet 48 does not have to be cooled to such a great extent. This may allow for a smaller heat exchanger 46 to be used.

FIG. 4 shows a cooling arrangement 20 in accordance with a third embodiment of the invention. Cooling arrangement 20 contains all of the features of FIG. 3, but with a different layout.

In FIG. 4, the high-temperature gas path of the heat exchanger 46 is positioned before the turbine 22. Therefore, the inlet 48 receives high-pressure high-temperature air from the turbine inlet 24 and the outlet 50 delivers air to the turbine 22. The low temperature inlet 52 is positioned between the compressor inlet 30 and the compressor 28.

The main advantage of this arrangement is that the heat exchanger 46 receives the hot and cold air flows with the maximum possible temperature difference between them. This increases heat dissipation efficiency of the heat exchanger. However this arrangement relies on sufficient cooling air inlet pressure to drive the cooling air through the heat exchanger and it may not be possible to recycle the used cooling air.

FIG. 5 shows a cooling arrangement 20 in accordance with a fourth embodiment of the invention. Cooling arrangement 20 contains all of the features of FIGS. 3 and 4, but with a different layout.

In FIG. 5, the high temperature gas path of the heat exchanger 46 is positioned before the turbine 22. Therefore, the inlet 48 receives high-pressure high-temperature air from the turbine inlet 24 and the outlet 50 delivers air to the turbine 22. The low temperature inlet 52 is positioned between the compressor 28 and the compressor outlet 32.

The main advantage of this arrangement is that it removes the need for sufficient cooling air inlet pressure to drive the cooling air through the heat exchanger, as in FIG. 4, but also still provides a large temperature difference between the high pressure hot source air and the cooling air to increase heat dissipation efficiency.

Although it has been described that the gas cooler 20 uses air as the gas, it should be readily apparent that any other suitable gas could be used.

Instead of or in addition to the bypass valve 44, it may be appropriate in some applications to provide a particle separator to remove particles from the gas flow through the turbine 22, compressor 28 or both. The low pressure source can be sized to ensure that the pressure margin required for the particle separator is not detrimental.

The invention claimed is:

1. A gas cooler for providing high-pressure sealing gas to a bearing chamber, the gas cooler comprising:
 a turbine;
 a turbine inlet arranged to receive gas to drive the turbine and a turbine outlet arranged to deliver turbine outlet gas output from the turbine;
 a compressor arranged to be driven by the turbine;
 a compressor inlet arranged to receive gas to be compressed by the compressor and a compressor outlet arranged to deliver compressor outlet gas output from the compressor; and
 a cooler outlet in fluid communication with the turbine outlet and the compressor outlet and intended to deliver high-pressure sealing gas to a bearing chamber, the high-pressure sealing gas comprising gas merged from the turbine outlet gas and the compressor outlet gas.

2. A gas cooler according to claim 1, wherein the turbine comprises a centrifugal turbine and/or wherein the compressor comprises a centrifugal compressor.

3. A gas cooler according to claim 1, wherein the turbine comprises at least one turbine paddle rotatable within a chamber and wherein the compressor comprises at least one compressor paddle rotatable within a chamber.

4. A gas cooler according to claim 3, wherein the turbine paddle and the compressor paddle are rotatably coupled.

5. A gas cooler according to claim 4, wherein the turbine paddle and the compressor paddle are rotatably coupled by a common shaft.

6. A gas cooler according to claim 1, further comprising a heat exchanger having a high-temperature gas path between the turbine inlet and the turbine outlet and a low-temperature gas path separated from the high-temperature gas path and having a low-temperature inlet between the compressor inlet and the compressor outlet and a low-temperature outlet, wherein in use the gas in the low-temperature gas path cools the gas in the high-temperature gas path.

7. A gas cooler according to claim 6, wherein the high-temperature gas path is after the turbine.

8. A gas cooler according to claim 6, wherein the high-temperature gas path is before the turbine.

9. A gas cooler according to claim 6, wherein the low-temperature inlet of the heat exchanger is after the compressor.

10. A gas cooler according to claim 6, wherein the low-temperature inlet of the heat exchanger is before the compressor.

11. A gas cooler according to claim 6, further comprising a valve arranged to control the gas flow through the low-temperature gas path.

12. A gas cooler according to claim 1, further comprising a bypass line after the turbine and having a bypass outlet arranged to discharge debris contaminated gas output from the turbine.

13. A gas cooler according to claim 12, further comprising a bypass valve arranged to control the gas flow out of the bypass outlet.

14. A gas turbine engine comprising a bearing chamber and a gas cooler in accordance with claim 1, wherein the cooler outlet is arranged to supply high-pressure sealing gas to the bearing chamber.

15. A gas turbine engine according to claim 14, wherein high-pressure high-temperature air from a compressor stage of the gas-turbine engine is received by the turbine inlet of the cooler.

16. A method of cooling gas and providing high-pressure sealing gas to a bearing chamber, comprising:
 receiving gas at a turbine inlet so as to drive a turbine and delivering gas output from the turbine from a turbine outlet;
 receiving gas at a compressor inlet and compressing the gas using a compressor driven by the turbine and delivering gas output from the compressor at a compressor outlet;
 merging the gas delivered from the turbine outlet and the compressor outlet; and
 delivering the merged gas from a cooler outlet to a bearing chamber as high-pressure sealing gas.

* * * * *